US008720996B2

(12) United States Patent
Nazione et al.

(10) Patent No.: US 8,720,996 B2
(45) Date of Patent: May 13, 2014

(54) FOLDING SEAT

(75) Inventors: Michael C. Nazione, Howell, MI (US);
Steven P. Livesey, Walled Lake, MI (US); Munur Omer Dagcioglu, West Bloomfield, MI (US)

(73) Assignee: Johnson Controls Technology Company, Holland, MI (US)

( * ) Notice: Subject to any disclaimer, the term of this patent is extended or adjusted under 35 U.S.C. 154(b) by 490 days.

(21) Appl. No.: 13/062,192

(22) PCT Filed: Sep. 9, 2009

(86) PCT No.: PCT/US2009/056354
§ 371 (c)(1),
(2), (4) Date: Mar. 3, 2011

(87) PCT Pub. No.: WO2010/030660
PCT Pub. Date: Mar. 18, 2010

(65) Prior Publication Data
US 2011/0163582 A1     Jul. 7, 2011

Related U.S. Application Data

(60) Provisional application No. 61/095,713, filed on Sep. 10, 2008.

(51) Int. Cl.
*B60N 2/10* (2006.01)
*B60N 2/02* (2006.01)

(52) U.S. Cl.
USPC ........... 297/336; 297/326; 296/65.09; 296/66

(58) Field of Classification Search
USPC ............ 297/336, 316, 326, 378.1; 296/65.05, 296/65.09, 66
See application file for complete search history.

(56) References Cited

U.S. PATENT DOCUMENTS

| 5,038,437 | A  | * | 8/1991 | Russell et al. ................... 16/266 |
| 6,375,255 | B1 | * | 4/2002 | Maruta et al. ................... 297/15 |
| 6,773,067 | B2 | * | 8/2004 | Kim ............................... 297/334 |
| 7,121,624 | B2 | * | 10/2006 | Pejathaya et al. ........ 297/378.12 |
| 7,165,801 | B2 | * | 1/2007 | Tame et al. ................ 296/65.09 |
| 2007/0090663 | A1 | * | 4/2007 | Ewers et al. ............... 296/65.09 |
| 2011/0062761 | A1 |   | 3/2011 | Seibold et al. |

FOREIGN PATENT DOCUMENTS

| JP | 1-138823 | 9/1989 |
| JP | 2010-517863 | 5/2010 |
| WO | 2008098200 | 8/2008 |

OTHER PUBLICATIONS

English language translation of "Notice of Reasons for Rejection" from the Japanese Patent Office, Mar. 6, 2013.

* cited by examiner

*Primary Examiner* — Milton Nelson, Jr.
(74) *Attorney, Agent, or Firm* — Butzel Long

(57) ABSTRACT

A dual front linkage system for a adjusting a vehicle seat includes a seat sub-frame member, a first linkage member, a second linkage member, and a base member. The first end of the seat sub-frame member is coupled to the second end of the first linkage member and the second end of the seat sub-frame member is coupled to the seat base, the first end of the first linkage member is coupled to the first end of the second linkage member, the second end of the second linkage member is coupled to the first end of the base member, and the second end of the base member is coupled to the vehicle. The linkage system enables the seat base and seat back to be folded forward and downward into a stowed position and allows the seat to be tumbled forward to enhance vehicle ingress and egress.

18 Claims, 15 Drawing Sheets

FOLDING SEAT

CROSS REFERENCE TO RELATED APPLICATIONS

This application claims the benefit of and priority to U.S. Provisional Patent Application No. 61/095,713, filed Sep. 10, 2008, titled: DUAL FRONT LINKAGE SYSTEM, in the name of Nazione et al. the entire contents of which is incorporated by reference herein.

BACKGROUND

The present disclosure relates generally to the field of vehicle seating. More specifically, this disclosure relates to a foldable vehicle seat assembly for use in a vehicle.

It is generally known to provide vehicle seat assemblies that may be flattened, folded, stowed, tumbled, and/or collapsed to increase the vehicle's cargo space, to utilize the seat as a load floor, to enhance the vehicle's utility, to facilitate entry into and exit from the vehicle, and/or to otherwise meet the needs and desires of the vehicle user.

There remains a significant and continuing need to provide an improved foldable vehicle seat assembly having an improved linkage system that better provides enhanced ingress/egress space and better manages the clearance between the head restraint and the vehicle floor.

SUMMARY

In one exemplary embodiment there is disclosed a seat for use in a vehicle, the seat having a seat base rotatably coupled to a seat back and a linkage system. The linkage system includes a first linkage member, a second linkage member, and a base member, the first linkage member being connected to a seat sub-frame member of the seat base member. The first end of the seat sub-frame member is rotatably coupled to a second end of the first linkage member and a second end of the seat sub-frame member is coupled to the seat base. Further, the first end of the linkage member is rotatably coupled to the first end of the second linkage member, the second end of the second linkage member is rotatably coupled to the first end of the base member, and the second end of the base member is coupled to the vehicle. The linkage system enables the seat to be folded forward and downward from a first, design or seated position to a second or stowed position to create a floor and thereby enhance stowage capacity and ingress and egress into the vehicle. The linkage system enables the vehicle seat to also be pivotally rotated forward upon the first pivot pin from the second position to a third or tumble position wherein the seat base is folded flat on the seat base and the seat back and seat base are aligned substantially vertical relative the vehicle floor to thereby enhance the ingress and egress space of the vehicle.

DETAILED DESCRIPTION

Figure 1:
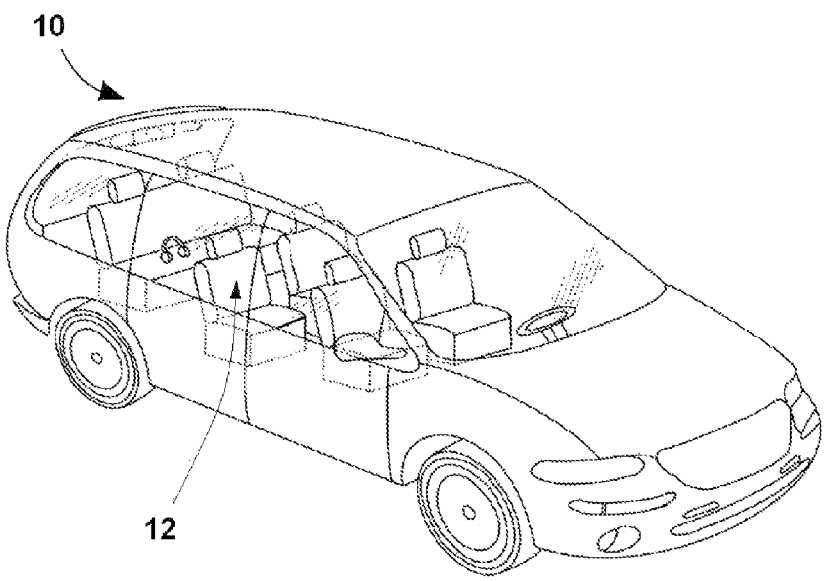
FIG. 1 is a perspective view of a vehicle having a seat assembly, according to an exemplary embodiment.
Figure 2:
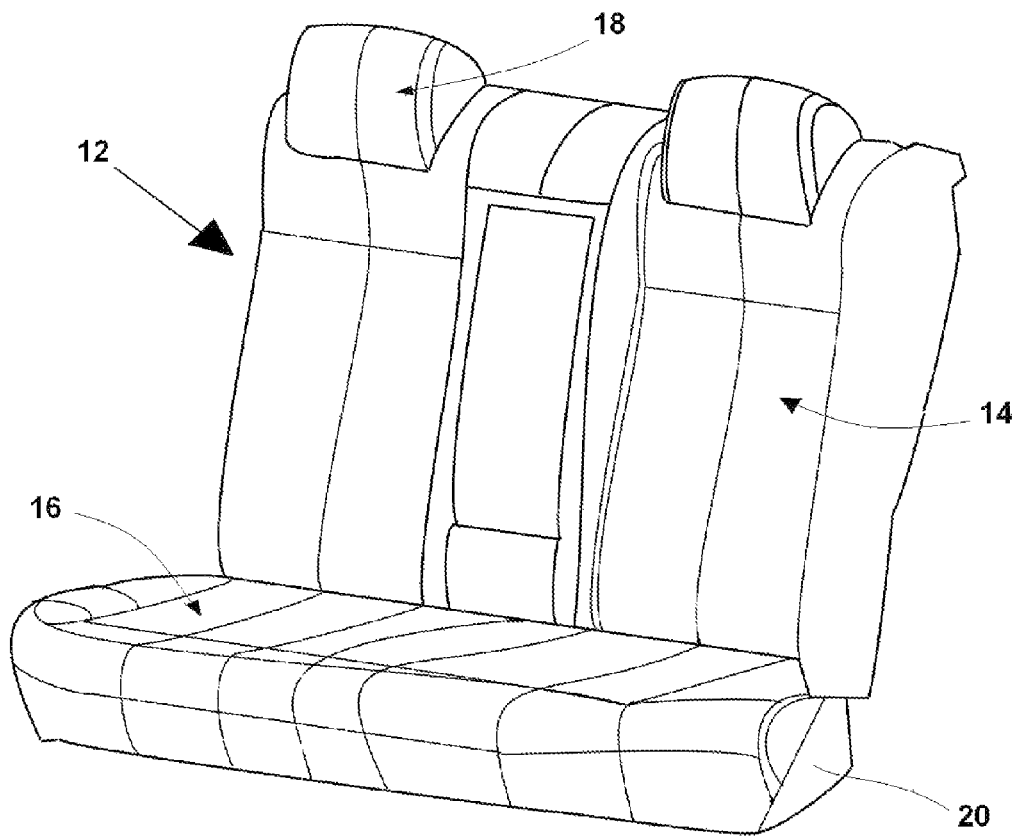
FIG. 2 is a perspective view of a seat assembly, according to an exemplary embodiment.

Referring generally to the figures and in particular to FIG. 1, a vehicle 10 is shown according an exemplary embodiment. The vehicle 10 includes one or more vehicle seats 12 provided for an occupant of the vehicle 10. While the vehicle 10 shown is a 4-door mini-van, it should be understood that the seat 12 may be used in a mini-van, sport utility, cross-over or any other type of vehicle or any other means in or by which someone travels or something is carried or conveyed for any market or application including everything from office seating and transportation to planes and space travel and everything in between. The vehicle seat 12 shown includes a seat back 14 and a seat cushion 16. One exemplary embodiment of an upholstered seat structure 12 is shown in FIG. 2. The seat 12 can, and typically does, include a head restraint 18 and a seat base portion 20 for supporting the seat cushion 16. The head restraint 18 extends upward from the seat back 14 and is configured to restrain the head of an occupant during an impact. The seat cushion 16 and/or base portion 20 can be configured to allow the seat 12 to be selectively positioned (manually or motor driven) relative to the vehicle 10 interior.

Figure 3A:
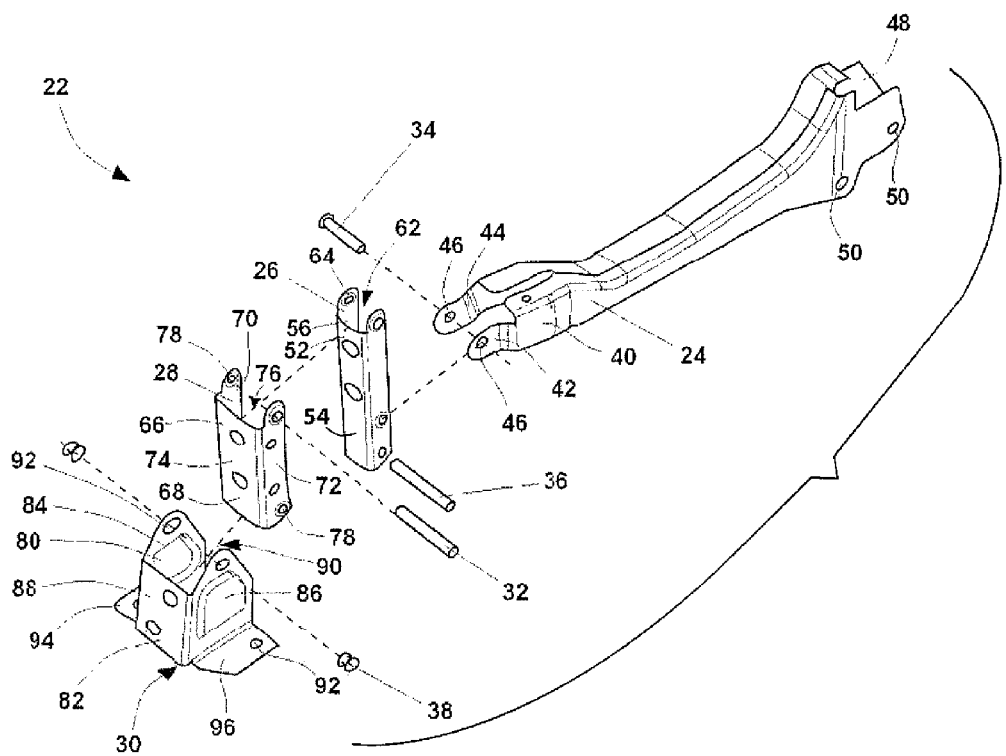
FIG. 3A is an exploded perspective view of a dual linkage system having a nested configuration for a vehicle seat assembly, according to an exemplary embodiment.
Figure 3B:
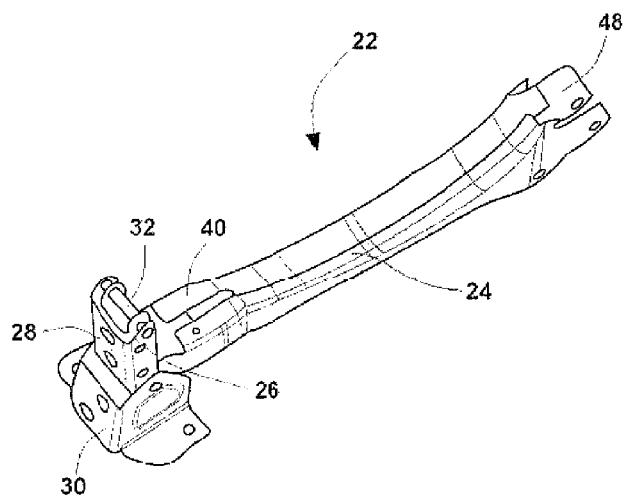
FIG. 3B is an isometric view of the dual linkage system of FIG. 3A, according to an exemplary embodiment.

Referring now to FIGS. 3A through 4B, a dual front linkage system 22 for a vehicle seat assembly 12 is shown according to an exemplary embodiment. The dual front linkage system 22 may be designed to have a nested configuration, as best shown in FIGS. 3A and 3B but can alternatively be designed in other configurations.

In the nested configuration, the dual front linkage system 22 includes, inter alia, a seat sub-frame member 24, a first linkage member 26, a second linkage member 28, a base member 30, a first pivot pin 32, a second pivot pin 34, a lock pin 36, and a plurality of fasteners 38 (e.g., bushings, screws, bolts, etc.). The seat sub-frame member 24 includes a first end 40 having a first and second attachment member (e.g., tabs, etc.) 42, 44 having a plurality of apertures 46 and a second end 48 having a plurality of apertures 50. The first linkage member 26 is generally rectangular in shape, includes a first and second end 52, 54, includes a first and second side wall 56, 58 that are spaced apart and perpendicular to a third side 60 that form a U-shaped space 62, and includes a plurality of apertures 64. The second linkage member 28 is generally rectangular in shape, includes a first and second end 66, 68, includes a first and second side wall 70, 72 that are spaced apart and perpendicular to a third side 74 that form a U-shaped space 76, and includes a plurality of apertures 78. The base member 30 is generally polygonal in shape (e.g., rectangular, triangular, etc.), includes a first and second end 80, 82, includes a first and second side wall 84, 86 that are spaced apart and perpendicular to a third side 88 that form a U-shaped space 90, includes a plurality of apertures 92, and also includes a first and second attachment members (e.g., tabs, etc.) 94, 96.

The seat sub-frame member 24 is pivotally coupled at its first end 40 to the second end 54 of the first linkage member 26 via the attachment members 42, 44 and the second pivot pin 34 and coupled at its second end 48 to the vehicle seat 12 (e.g., seat base, etc.). The first linkage member 26 is pivotally coupled at is first end 52 to the first end 66 of the second linkage member 28 via the first pivot pin 32. The first linkage member 26, when in the design or use position, is aligned substantially vertically within the U-shaped space 76 of the second linkage member 28, such that the second linkage member 28 at least partially straddles the first linkage member 26. The second linkage member 28 is pivotally coupled to the first end 80 of the base member 30 via the fasteners (e.g., bushings, etc.) 38. The second linkage member 28, when in the design or use position, is aligned substantially vertically within the U-shaped space 90 of the base member 30, such that the base member 30 straddles the second linkage member 28. The base member 30 may be coupled (e.g., mounted, attached, etc.) to a portion of the vehicle 10 (e.g., floor, etc.) via the attachment members 94, 96 using fasteners (e.g., bolts, screws, etc.) or other attachment techniques (e.g., welding, etc.). The lock pin 36 is lockably inserted into the dual front linkage system 22 (e.g., apertures on base member 30 and second linkage member 28) to lock and secure the dual front linkage system 22 and thereby the vehicle seat 12 in position (e.g., design or use position, etc.). To unlock the dual front linkage system 22 and reconfigure the vehicle seat 12 into another position (e.g., stowed, folded, etc.), the lock pin 36 is removed or disengaged from the dual front linkage system 22 and the vehicle seat 12 is tumbled forward on the first and second pivot pins 32, 34 (i.e., pivot points).

Figure 4A:
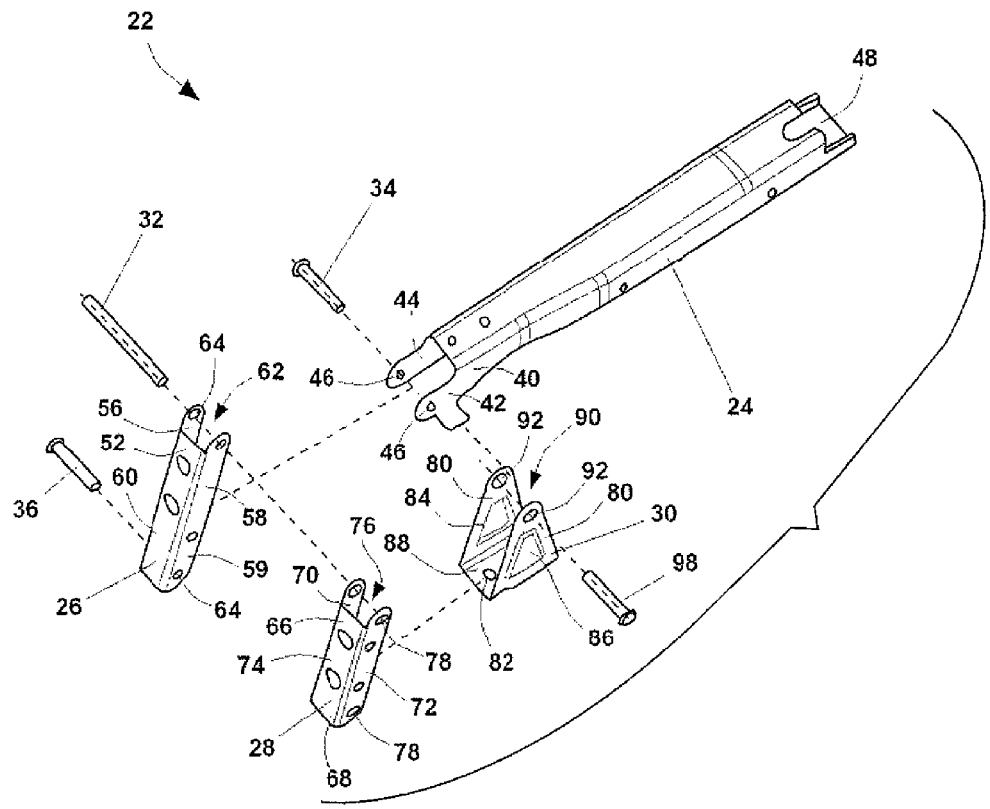
FIG. 4A is an exploded perspective view of a dual linkage system having a side-by-side configuration for a vehicle seat assembly, according to an exemplary embodiment.
Figure 4B:
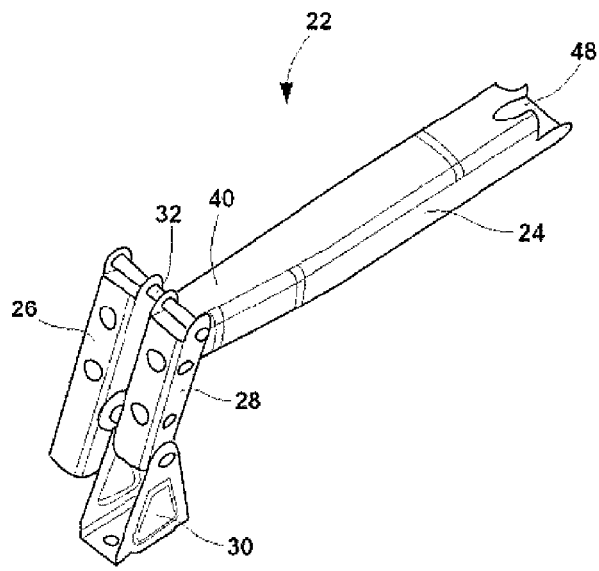
FIG. 4B is an isometric view of the dual linkage system of FIG. 4A, according to an exemplary embodiment.

According to an alternate embodiment, the front dual linkage system 22 may be designed to have a side-by-side configuration, as best shown in FIGS. 4A and 4B. In the side-by-side configuration, the dual front linkage system 22 includes, inter alia, a seat sub-frame member 24, a first linkage member 26, a second linkage member 28, a base member 30, a first pivot pin 32, a second pivot pin 34, a lock pin 36, and a plurality of fasteners 38 (e.g., bushings, screws, bolts, etc.), and also a third pivot pin 98. The seat sub-frame member 24 is pivotally coupled at its first end 40 to the second end 54 of the first linkage member 26 via the attachment members 42, 44 and the second pivot pin 34 and coupled at its second end 48 to the vehicle seat 12 (e.g., seat base, seat frame, etc.). The first linkage member 26 is pivotally coupled at its first end 52 to the first end 66 of the second linkage member 28 via the first pivot pin 32. The first linkage member 26, when in the design or use position, is situated adjacent and parallel to the second linkage member 28 (i.e., side-by-side such that the second side wall 58 of the first linkage member 26 is adjacent the first side wall 70 of the second linkage member 28). The second linkage member 28 is pivotally coupled to the first end 80 of the base member 30 via the third pivot pin 98. The second linkage member 28, when in the design or use position, is aligned substantially vertically within the U-shaped space 90 of the base member 30, such that the base member 30 straddles the second linkage member 28. The base member 30 may be coupled (e.g., mounted, attached, etc.) to a portion of the vehicle 10 (e.g., floor, etc.) using fasteners (e.g., bolts, screws, etc.) or other attachment techniques (e.g., welding, etc.). The lock pin 36 is lockably inserted into the dual front linkage system 22 (e.g., apertures on base member 30) 28 to lock and secure the dual front linkage system 22 and thereby the vehicle seat 12 in position (e.g., design or use position, etc.). To unlock the dual front linkage system 22 and reconfigure the vehicle seat 12 into another position (e.g., stowed, folded, etc.), the lock pin 36 is removed or disengaged from the dual front linkage system 22 and the vehicle seat 12 is tumbled forward (pivoted) on the first, second, and third pivot pins 32, 34, 98 (i.e., pivot points).

Figure 5:
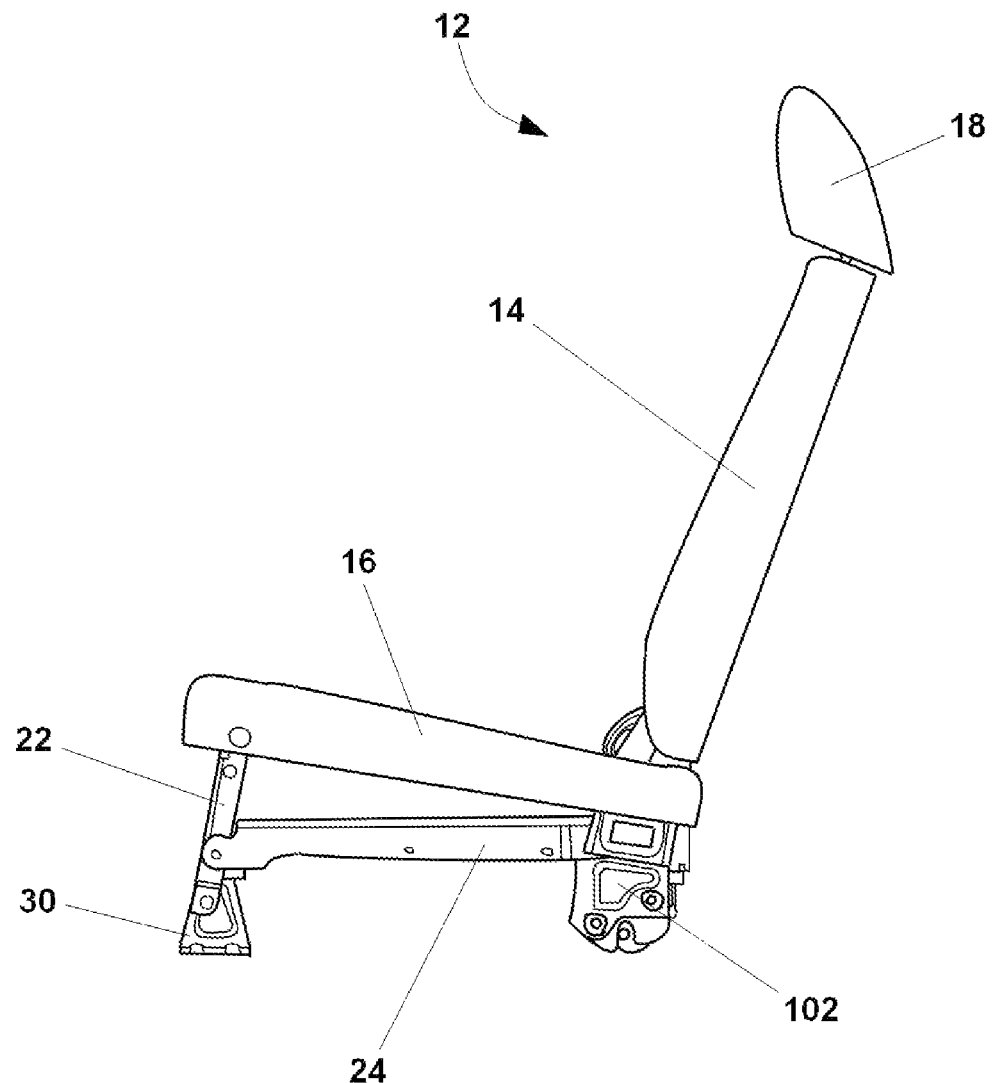
FIG. 5 is a side view of a seat assembly having a dual linkage system in a design seating position, according to an exemplary embodiment.

Referring now to FIG. 5, a seat assembly 12 is shown in a design or use position and having a dual linkage system 22 for pivotally adjusting the orientation of the seat assembly 12. The dual linkage system 22 adjusts the seat assembly 12 between one of a design position, a stow position, and/or an easy-entry position (i.e., stow and tumble position) as shown. The seat assembly 12 further includes a first or inner rear latch 100, a second or outer rear latch 102, a first rear striker (not shown) and a second rear striker (not shown), as shown in the disclosed exemplary embodiment. Alternative embodiments are possible. The first and second rear latches 100, 102 are coupled at one end to the seat base 16 and include a second end for selectively attaching and detaching from a first and second striker (not shown), respectively. The first and second strikers are designed to be coupled in a stationary position to the vehicle 10 (e.g., vehicle floor, etc.) but may otherwise be designed. When the first and second rear latches 100, 102 are attached to the first and second strikers the seat base 16 is locked in a substantially parallel position relative to the vehicle 10 floor and the seat assembly 12 may be maintained in the design position, as shown in FIG. 5.

Figure 6:
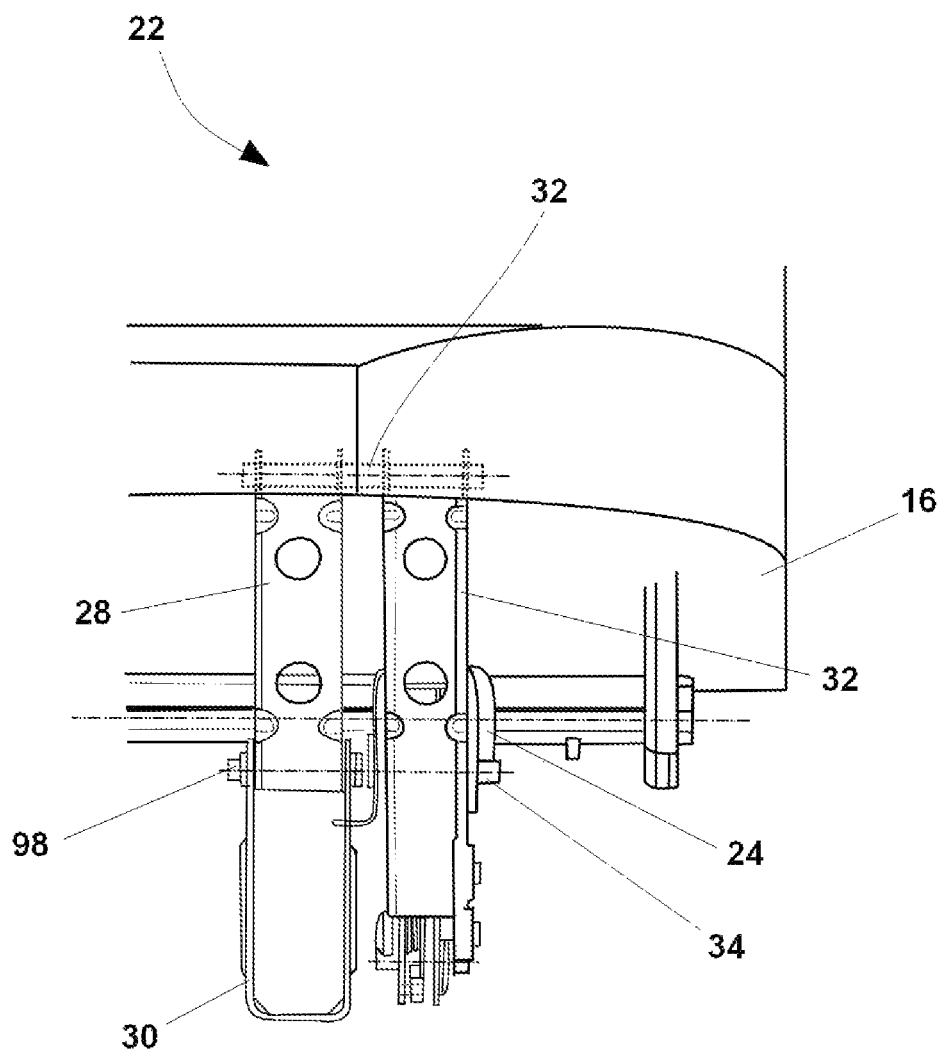
FIG. 6 is a front view of the dual linkage system of FIG. 5, according to an exemplary embodiment.

As shown in FIG. 6, the dual linkage system 22 includes a first or inner linkage member 26, a second or outer linkage member 28, a first or upper pivot pin 32, a second lower pivot pin 34, a third lower pivot pin 98, a seat sub-frame member 24, and a base member 30. The first linkage member 28 is pivotally coupled at one end 52 to the seat base 16 via the first pivot pin 32 and pivotally coupled at its second end 54 to the seat sub-frame member 24 via the second pivot pin 34. The second linkage member 28 is pivotally coupled at one end 66 to the seat base 20 via the first pivot pin 32 and pivotally coupled at its second end 68 to the base member 30 via the third pivot pin 98. The dual linkage system 22 enables a stowed flat seat 12 to move to a tumble position to provide for an easy-entry option given the vehicle 10 package requirements of a low cargo load floor and flat vehicle 10 floor pan. The two linkage members 26, 28 share a common upper pivot 32, but have independent lower pivots 34, 98 which in the embodiment shown are aligned. The linkage members 26, 28 move together when the seat 12 is moved from the design position to the stowed position. When reaching the stowed position, the first or inner linkage member 26 is locked to the seat sub-frame 24. The seat 12 is then optionally designed to rotate from the stowed position to the easy-entry (i.e., tumbled) position upon release of the rear floor latches 100, 102. The dual linkage system 22 enables tumble rotation to occur from a pivot that is coincident with the upper pivot of the cushion 16 stow flat link, which provides for maximum head restraint clearance to the vehicle 10 floor pan and maximum ingress/egress space for the rear seat occupant.

Figure 7:
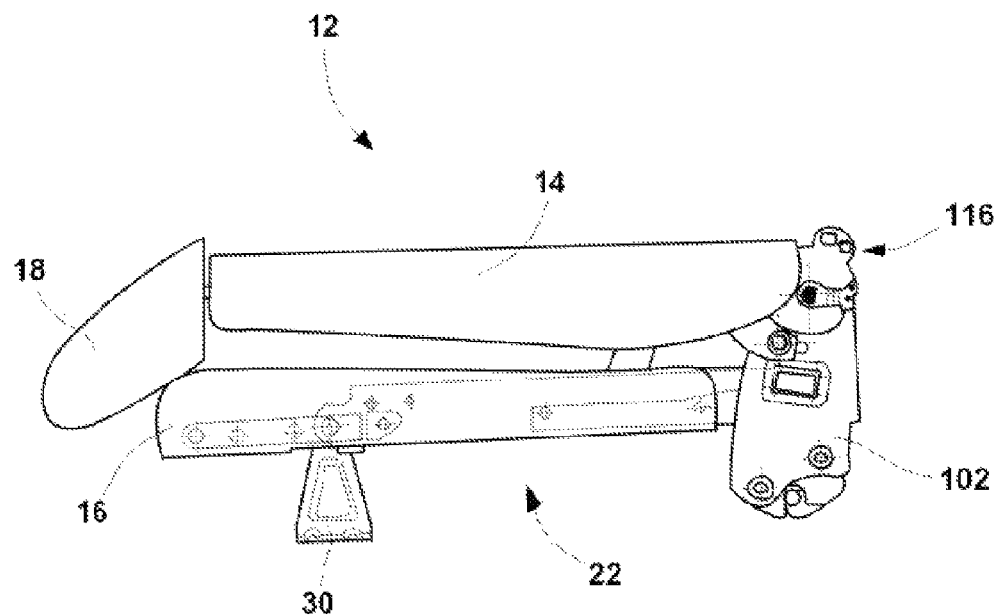
FIG. 7 is a side view of a seat assembly having a dual linkage system in a stowed position, according to an exemplary embodiment.

Referring now to FIG. 7, the vehicle seat 12 may be adjusted to be placed into the stowed position to create a load floor and to increase vehicle 10 interior space. To adjust the vehicle seat 12 to the stowed position, the seat back recliner mechanism 116 is released to collapse/fold the seat back 14 forwardly against the top surface of the seat base 16. The dual linkage system 22 is free (not locked) to move and the first and second linkage members 26, 28 are pivotally rotated forward from a substantially vertical (perpendicular) orientation relative to the vehicle 10 floor to a substantially horizontal (parallel) orientation relative the vehicle 10 floor via the first, second and third pivot pins 32, 34, 98. In this stowed position, the seat base 16 is positioned substantially flat and parallel to the vehicle 10 floor and the seat back 14 is positioned substantially flat and parallel against the top surface of the seat base 16. During the fold and tumble functioning of the vehicle seat assembly 12 having the dual linkage system 22, the rear latches 100, 102 are rigidly coupled to the seat assembly 12. According to another exemplary embodiment, the rear latches 100, 102 may be pivotally coupled to the seat assembly 12 whereby the rear latches 100, 102 may be rotated or folded and thereby further provide greater ingress and egress space when configuring the vehicle seat assembly 12 from the load floor to the tumble position.

Figure 8:
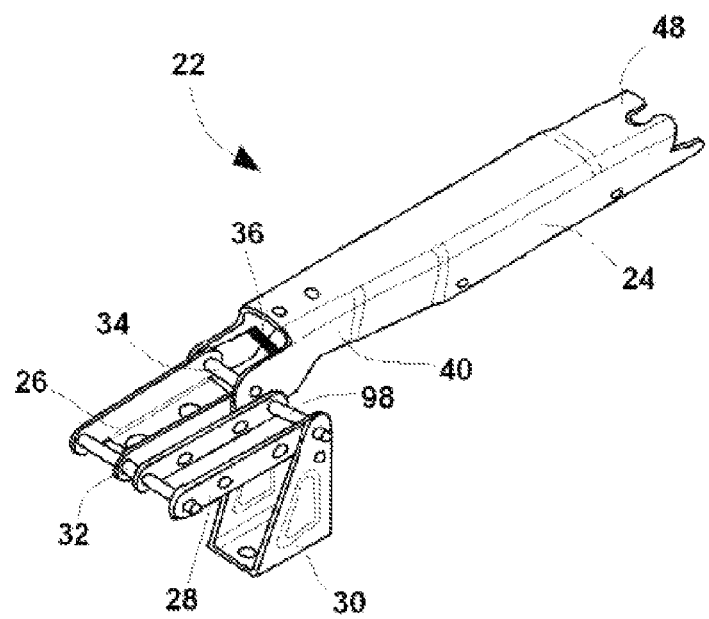
FIG. 8 is a perspective view of the dual linkage system of FIG. 7, according to an exemplary embodiment.

Referring now to FIG. 8, the dual linkage system 22 is shown in the stowed position according to an exemplary embodiment. When the vehicle seat 12 has been placed into the stowed position, the first (inner) and second (outer) linkage members 26, 28 extend horizontally forward (compared to the car forward direction) from their pivot pin attachments 32, 34, 98 with the seat sub-frame member 24 and base member 30, respectively. This enables the seat base 16 to be oriented lower and relatively flat against the vehicle 10 floor and thereby creating a load floor.

Figure 9:
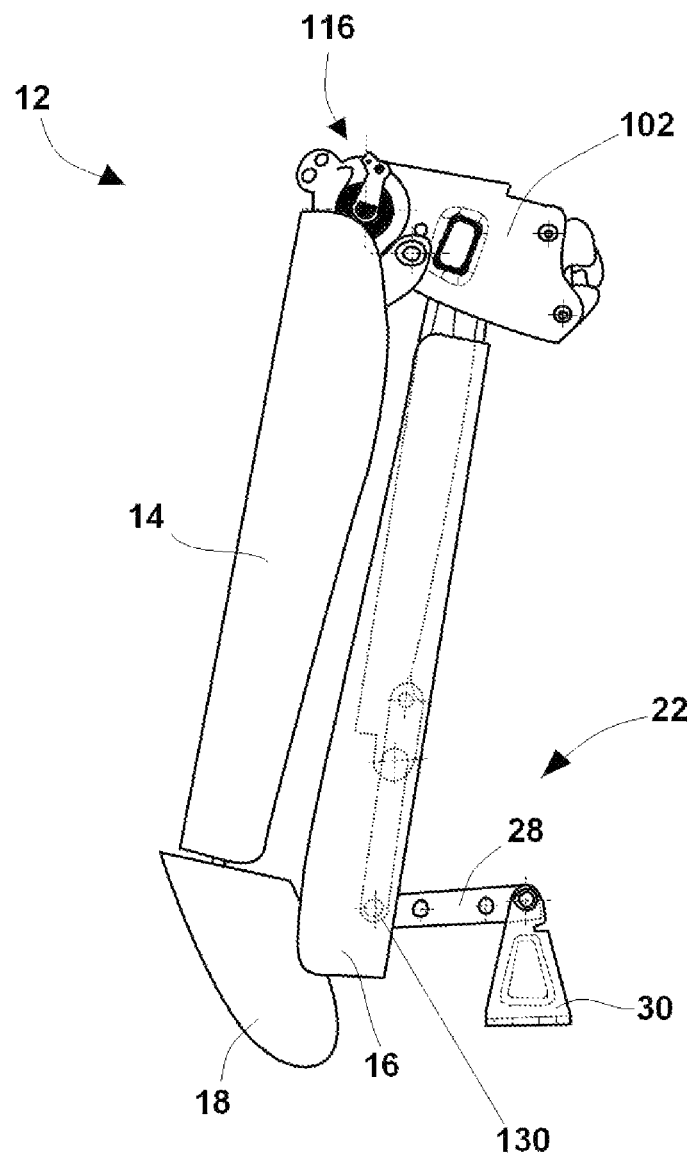
FIG. 9 is a side view of a seat assembly having a dual linkage system in an easy entry position, according to an exemplary embodiment.
Figure 10:
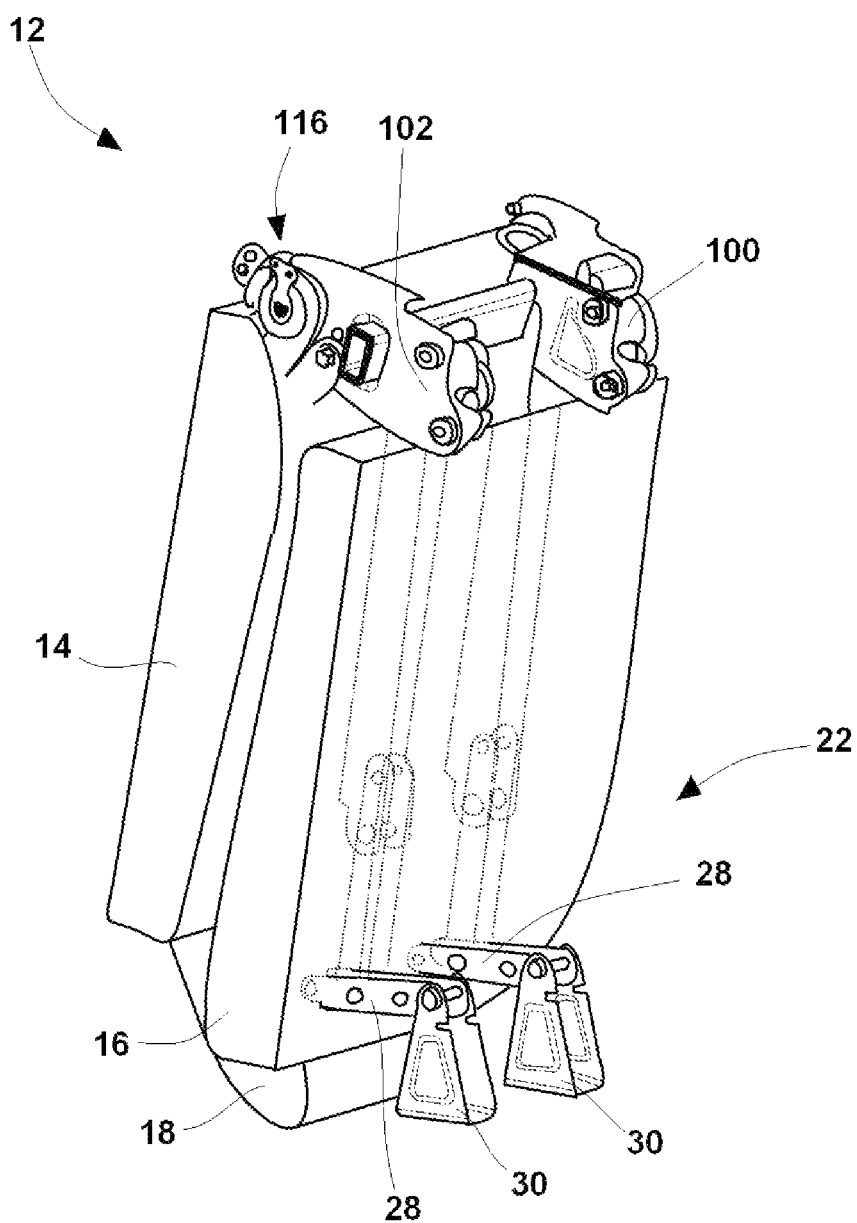
FIG. 10 is a rear perspective view of the seat assembly and dual linkage system of FIG. 9, according to an exemplary embodiment.
Figure 11:
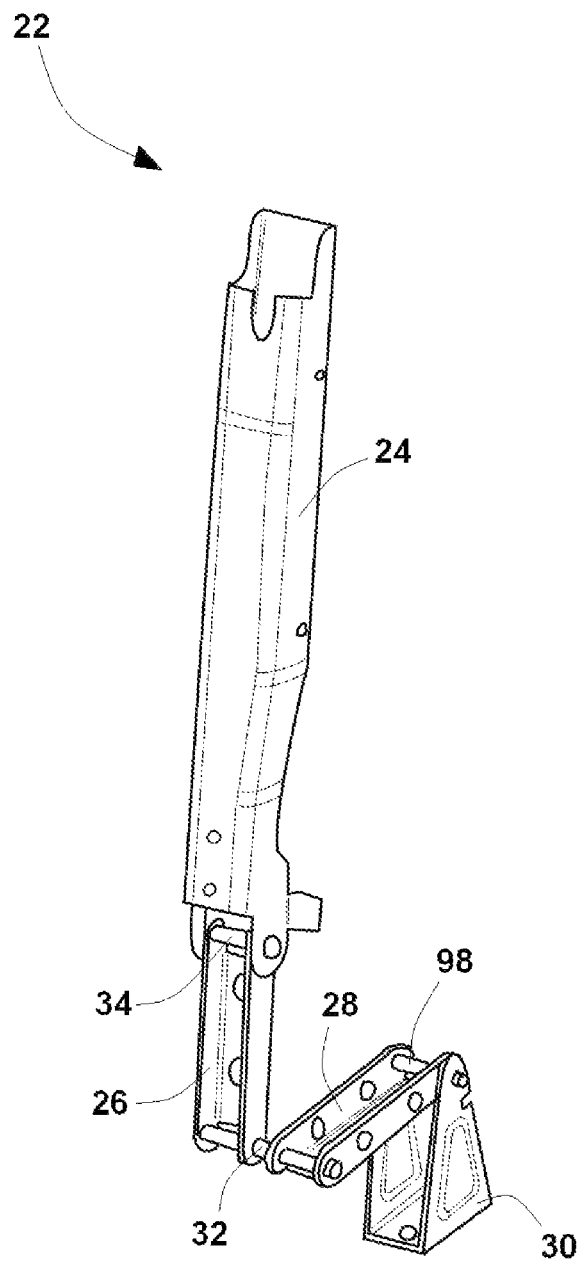
FIG. 11 is a front perspective view of the dual linkage system of FIG. 9, according to an exemplary embodiment.

Referring now to FIGS. 9 through 11, the vehicle seat 12 may also be adjusted to the easy entry position. To adjust the vehicle seat 12 into the easy entry position, the seat back recliner mechanism 116 is released and the seat back 14 is folded forward against the seat base 16. The first and second rear latches 100, 102 are then unlatched from the first and second striker respectively. The seat back 14, the seat base 16 and the first and second rear latches 100, 102 may then be pivotally rotated forward via the first pivot pin 32 such that the seat back 14, the seat base 16, and the first and second rear latches 100, 102 are in a substantially vertical (perpendicular) orientation relative to the vehicle 10 floor and thereby enhancing vehicle 10 interior space and/or allowing third row occupants to enter or exit (ingress/egress) the vehicle 10. The rear latches 100, 102 may also be retractable to further enhance the ingress and egress and storage capacity of the space. While the vehicle seat assembly 12 and the dual linkage system 22 are in the easy entry position, the first or inner linkage member 26 is in a substantially vertical orientation and the second or outer linkage member 28 is in a substantially horizontal orientation, as shown in FIGS. 9 through 11.

Figure 12:
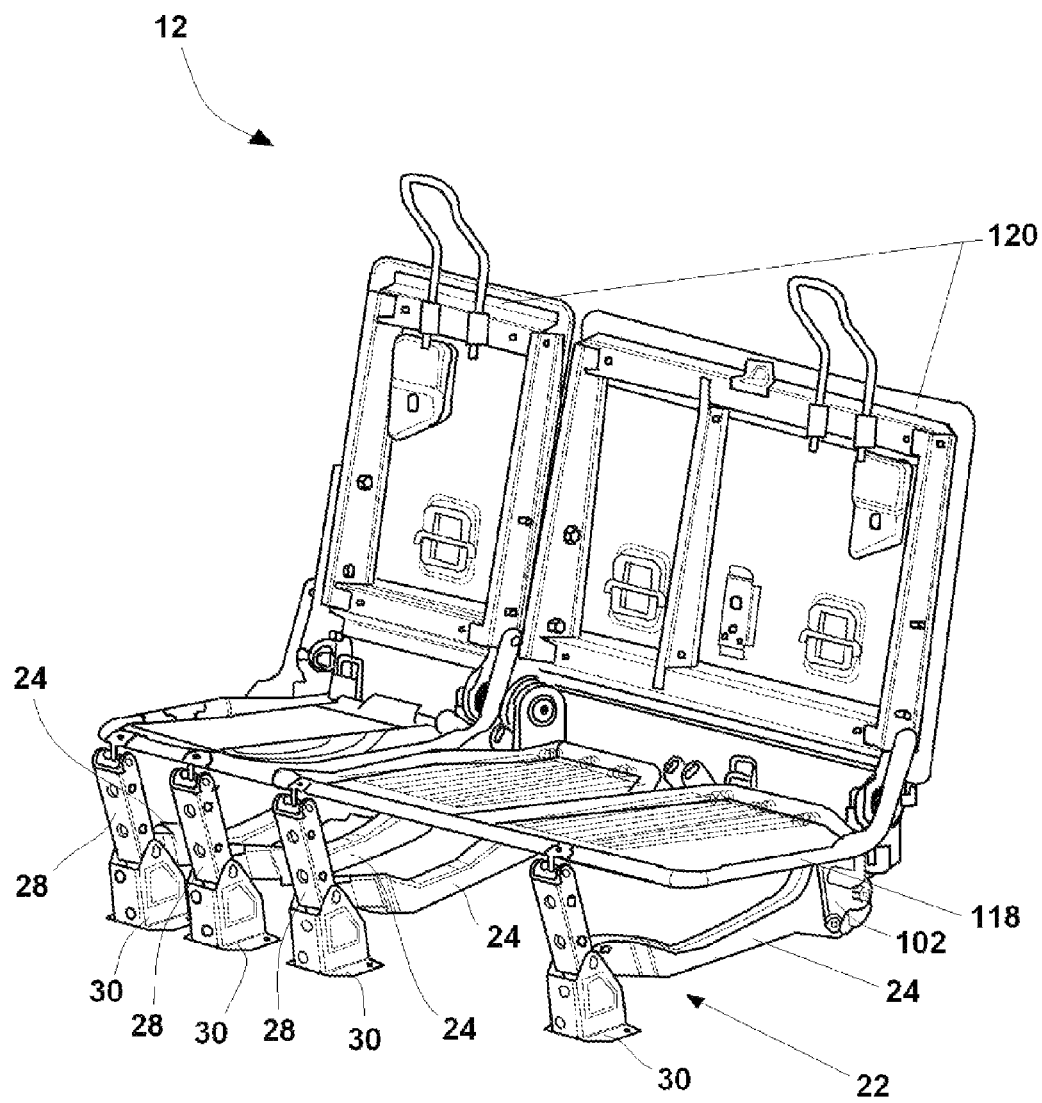
FIG. 12 is a front perspective view of a seat assembly having an alternate linkage arrangement, according to an exemplary embodiment.
Figure 13:
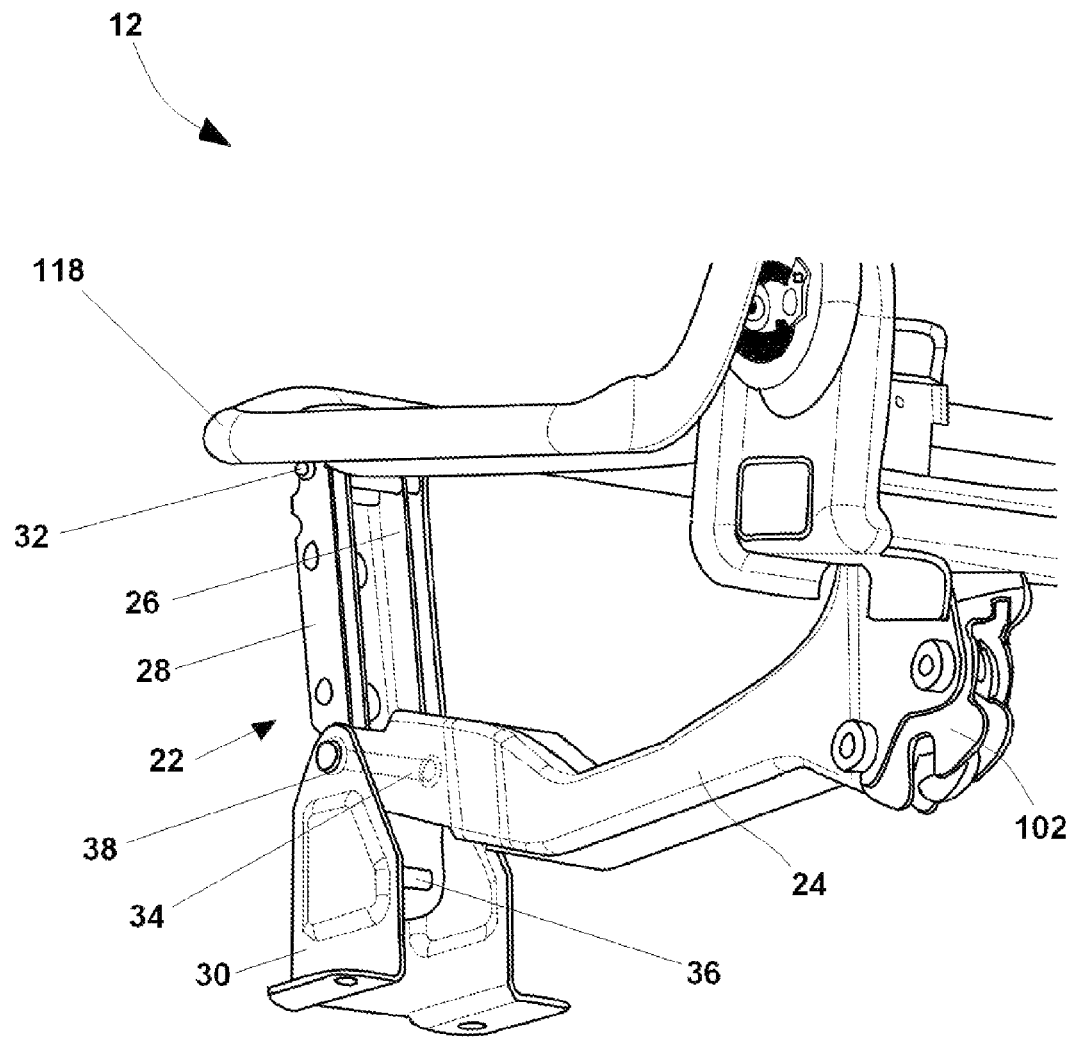
FIG. 13 is an enlarged rear perspective view of the linkage arrangement of FIG. 10, according to an exemplary embodiment.

FIGS. 12 and 13 show the dual linkage system 22 in the nested arrangement and coupled to a seat assembly 12 (seat base frame 118 and seat back frame 120). In this configuration, the first linkage member 26 is nested within the second linkage member 28, as best shown in FIG. 13.

Figure 14:
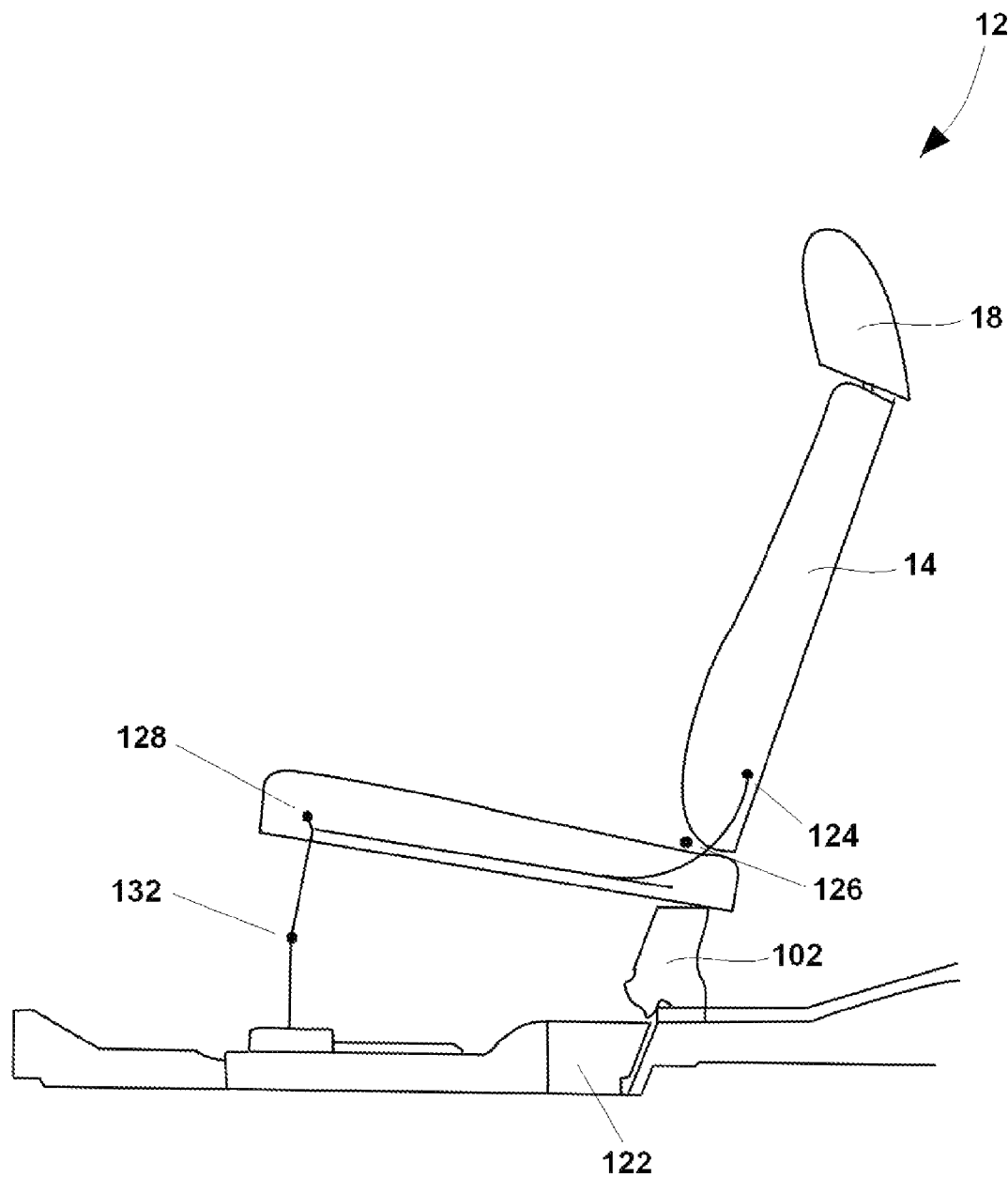
FIG. 14 is a side view of a seat assembly in a design position having multiple pivot points, according to an exemplary embodiment.

FIG. 14 shows a vehicle seat assembly 12 having a dual linkage system 22 in a design or use position and coupled to the vehicle floor pan 122. The vehicle seat assembly 12 and the dual linkage system 22 have a plurality of pivot points. The back stow pivot 124 is located on the lower end of the seat back 14 and enables the seat back 14 to be pivotally rotated forward to the stow position from the design or use position. In FIG. 14, the recliner pivot 126 is located on the recliner mechanism 116 and between the seat back 14 and the seat base 16 and enables the seat back 14 to be selectively and pivotally adjusted in the fore and aft directions. The front link upper pivot point 128 is located on the front portion of the seat base 16 where the first and second linkage members 26, 28 are coupled to the seat base 16. The front link upper pivot point 128 enables the seat base 16 to be pivoted forward into the stowed position and subsequently becomes the tumble pivot point 130 and enables the seat 12 to be adjusted (or tumbled) forward into the easy entry position. The front link lower pivot point 132 is located where the first and second linkage members 26, 28 are coupled to the base member 30 and/or the seat sub-frame member 24. The front link lower pivot 132 point enables the seat base 16 to be adjusted (i.e., pivoted) forward into the stowed position.

Figure 15:
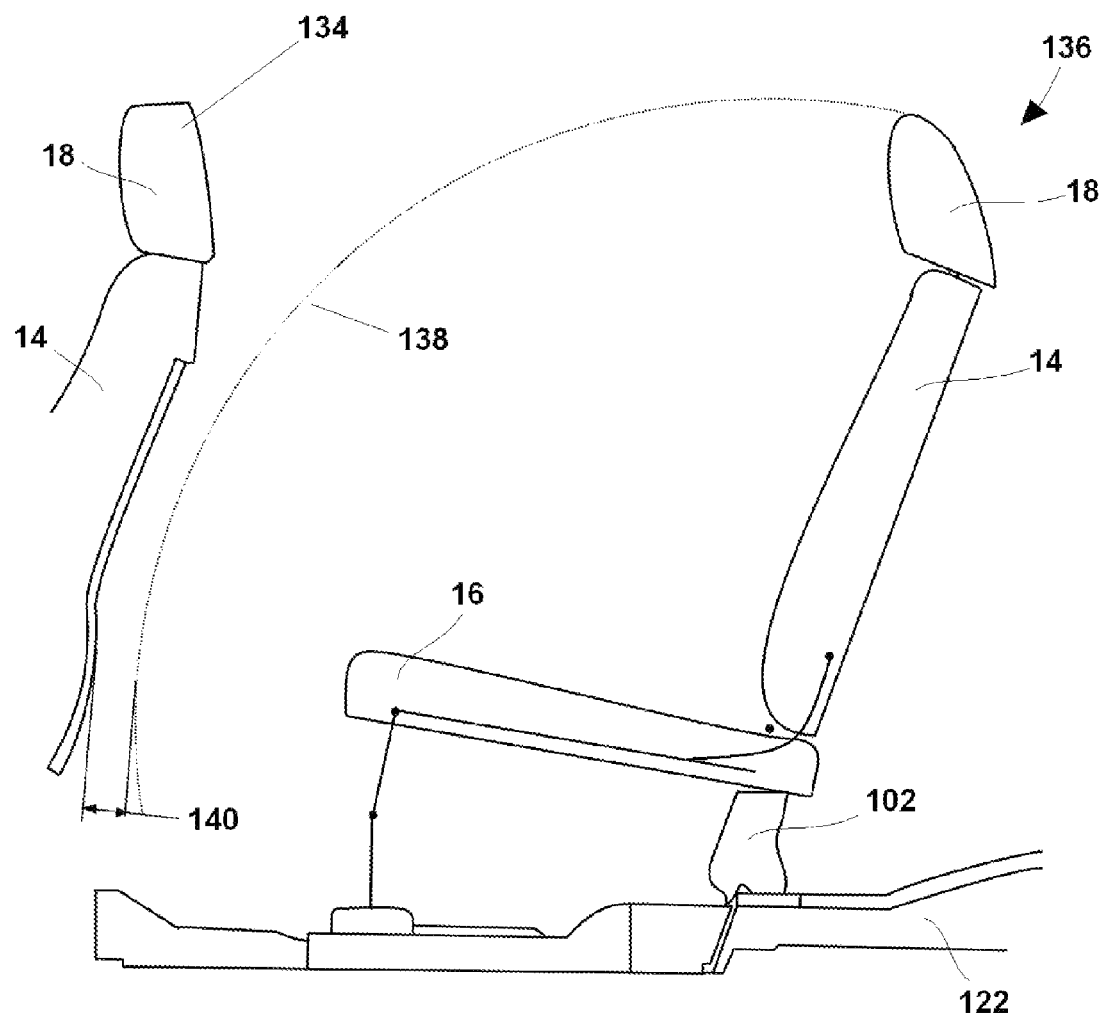
FIG. 15 is a side view of a front row seat assembly in a design position and a second row seat assembly in a design position, according to an exemplary embodiment.

Referring now to FIG. 15, first a second row seat assemblies 134, 136 are shown in their design positions. While in the design position, the seat back 14 of the second row vehicle seat assembly 136 has a swing arc trajectory 138 that enables the seat back 14 to be rotated pivotally forward such that the head restraint 18 (for the position shown) does not interfere with the front row vehicle seat assembly 134. As shown, there is sufficient clearance 140 between the front row vehicle seat assembly 134 and the swing arc trajectory 134 of the seat back 14 of the second row seat assembly 136.

Figure 16:
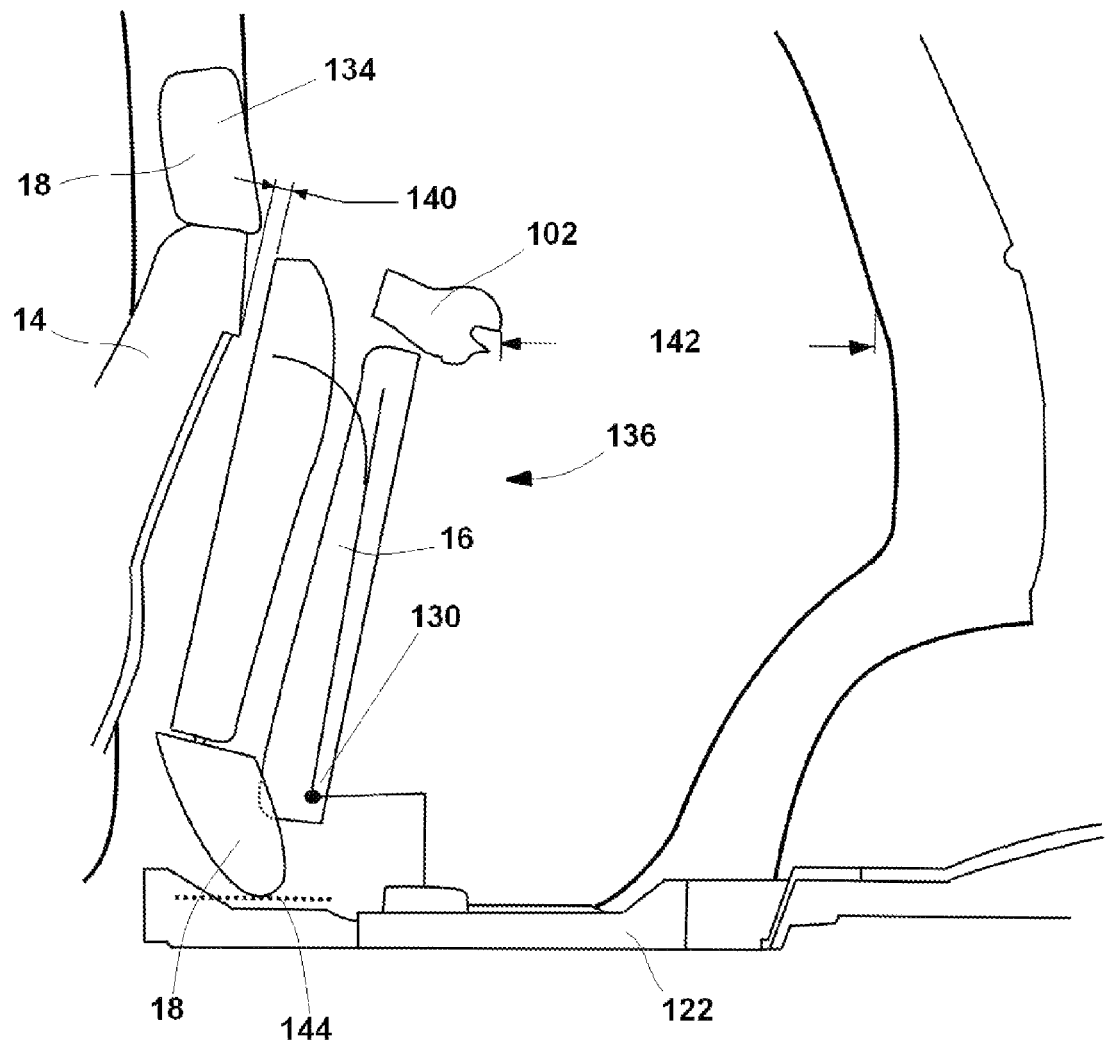
FIG. 16 is a side view of a front row seat assembly in a design position and a second row seat assembly in an easy-entry position, according to an exemplary embodiment.
Figure 17:
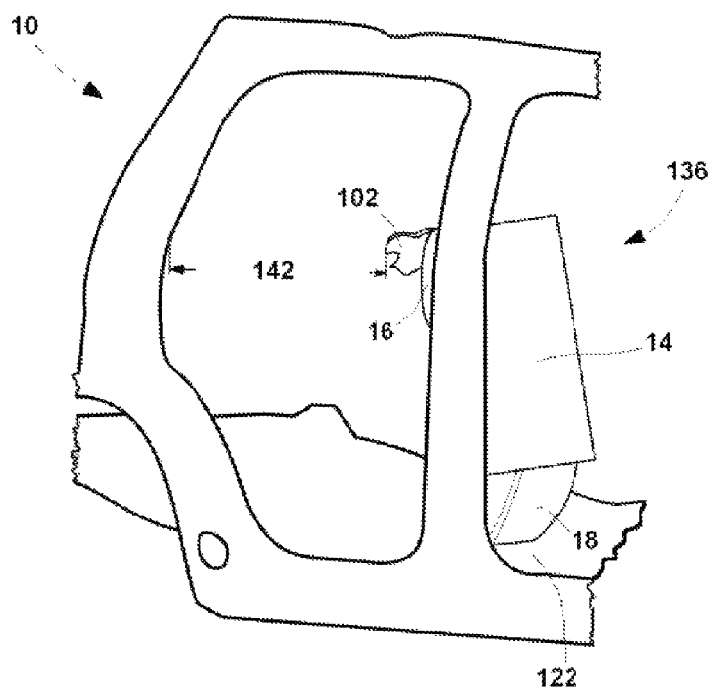
FIG. 17 is a perspective view of a second row seat assembly in an easy-entry position, according to an exemplary embodiment.

Referring now to FIGS. 16 and 17, a second row seat assembly 136 in an easy-entry position within a vehicle 10 interior is shown. In the easy-entry position, the second row seat assembly 136 (i.e., the seat back and seat base, etc.) may be pivotally adjusted (i.e., rotated or tumbled) forward against the posterior surface of the seat back 14 of the first row seat assembly 134 and thereby maximizing the ingress/egress space 142 (i.e., easy entry space) for the occupant entering/exiting the vehicle 10 interior and the head restraint to floor pan clearance 144.

Figure 18:
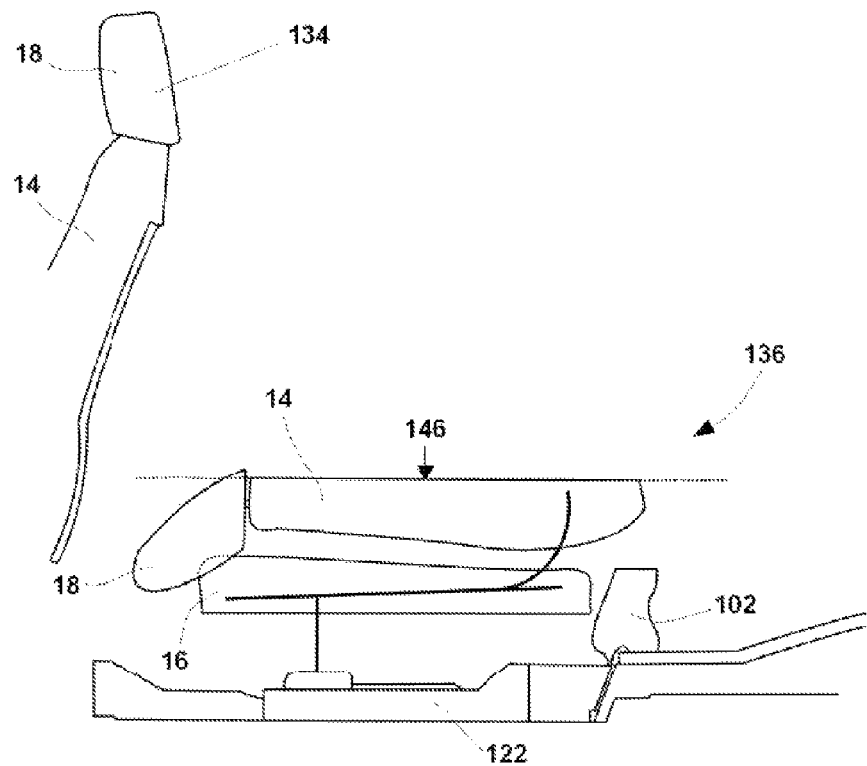
FIG. 18 is a side view of a first row seat assembly in a design position and a second row seat assembly in a stowed position, according to an exemplary embodiment.

Referring now to FIG. 18 a second row seat assembly 136 is shown in a stowed position. In the stowed position, the seat back 14 of the second row seat assembly 136 may be adjusted (pivoted or rotated) forward (i.e., folded, collapsed, etc.) against the top surface of the seat base 16 of the second row seat assembly 136. In this configuration, the seat back 14 and the seat base 16 are substantially flat and horizontal (parallel) relative to the vehicle 10 floor and thereby create a cargo load floor for enhanced interior vehicle 10 space.

For purposes of this disclosure, the term "coupled" means the joining of two components (mechanical and/or electrical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

It is also important to note that the construction and arrangement of the elements of the vehicle seat as shown in the preferred and other exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures and combinations. Accordingly, all such modifications are intended to be included within the scope of the present innovations. Other substitutions, modifications, changes and omissions may be made in the design, operating conditions and arrangement of the preferred and other exemplary embodiments without departing from the spirit of the present innovations.

What is claimed is:

1. A vehicle seat coupled to a vehicle and having a linkage system for adjusting the seat, comprising:
   a seat base;
   a seat back coupled to the seat base;
   a seat sub-frame member having first and second ends, wherein the second end of the seat sub frame member is coupled to the seat base;
   a first linkage member having first and second ends, wherein the first end of the seat sub frame member is rotatably coupled to the second end of the first linkage member;
   a second linkage member having first and second ends, and the first end of the first linkage member is rotatably coupled to the first end of the second linkage member; and
   a base member having first and second ends and the second end of the second linkage member is rotatably coupled to the first end of the base member, and the second end of the base member is coupled to the vehicle; such that the seat base folds forward and downward from a first position to a second position to create a load floor, and wherein a first pivot pin couples the first and second linkage members together and operates as a pivot point enabling the seat to rotate thereon, and wherein the vehicle seat rotates forward about the first pivot pin from the second position to a third position.

2. The vehicle seat of claim 1, wherein a side wall of the first linkage member is adjacent and aligned with a side wall of the second linkage member in the first position.

3. The vehicle seat of claim 1 wherein the first linkage member moves to a substantially vertical orientation and the second linkage member stays at a substantially horizontal orientation when the seat is moved from the second position to a third position.

4. The vehicle seat of claim 1, wherein the seat back is substantially upright relative to the seat base in the first position and the seat back is folded forward and aligned with the seat base in the second position.

5. The vehicle seat of claim 1 wherein the base member includes a first wall, a second wall spaced apart from the first wall and a third wall that interconnects the first and second walls such that the base member has a U-shape.

6. The vehicle seat of claim 1 wherein the first and second linkage members move together as the seat is moved from the first position to the second position, and the first linkage member is locked to the seat sub-frame member.

7. The vehicle seat of claim 1, wherein the seat back is folded forward against the seat base and the seat back and seat base are perpendicular relative to a floor of the vehicle in the third position.

8. The vehicle seat of claim 1, wherein the vehicle seat includes at least one latch for interlocking with a striker coupled to the vehicle to thereby lock the vehicle seat in position.

9. The vehicle seat of claim 1, wherein the linkage system further comprises a lock pin for insertion into an aperture located on the first linkage member and into an aperture on the base member to thereby lock the linkage system.

10. The vehicle seat of claim 1 wherein the first linkage member includes a first wall, a second wall spaced apart from the first wall and a third wall that interconnects the first and second walls such that the first linkage member has a U-shape.

11. The vehicle seat of claim 1 wherein the second linkage member includes a first wall, a second wall spaced apart from the first wall and a third wall that interconnects the first and second walls such that the second linkage member has a U-shape.

12. A vehicle seat coupled to a vehicle and having a linkage system for adjusting the seat, comprising:
   a seat base;
   a seat back coupled to the seat base;
   a seat sub-frame member having first and second ends, wherein the second end of the seat sub frame member is coupled to the seat base;
   a first linkage member having first and second ends, wherein the first end of the seat sub frame member is rotatably coupled to the second end of the first linkage member;
   a second linkage member having first and second ends, and the first end of the first linkage member is rotatably coupled to the first end of the second linkage member; and
   a base member having first and second ends and the second end of the second linkage member is rotatably coupled to the first end of the base member, and the second end of the base member is coupled to the vehicle; such that the seat base folds forward and downward from a first position to a second position to create a load floor, and wherein a first pivot pin couples the first and second linkage members together and operates as a pivot point enabling the seat to rotate thereon, and wherein the vehicle seat rotates forward about the first pivot pin from the second position to a third position, wherein the first linkage member is nested within the second linkage member in the first position.

13. A vehicle seat coupled to a vehicle and having a linkage system for adjusting the seat, comprising:

a seat base;

a seat back coupled to the seat base;

a seat sub-frame member having first and second ends, wherein the second end of the seat sub frame member is coupled to the seat base;

a first linkage member having a first end and a second end, wherein the first linkage member includes a first wall, a second wall spaced apart from the first wall and a third wall that interconnects the first and second walls such that the first linkage member has a U-shape, and the first end of the seat sub frame member is rotatably coupled to the second end of the first linkage member;

a second linkage member having first and second ends, wherein the second linkage member includes a first wall, a second wall spaced apart from the first wall and a third wall that interconnects the first and second walls such that the second linkage member has a U-shape, and the first end of the first linkage member is rotatably coupled to the first end of the second linkage member; and a base member having first and second ends, wherein the base member includes a first wall, a second wall spaced apart from the first wall and a third wall that interconnects the first and second walls such that the base member has a U-shape, and the second end of the second linkage member is rotatably coupled to the first end of the base member, and the second end of the base member is coupled to the vehicle such that the first and second linkage members move together as the seat is moved from a first position to a second position, and the first linkage member is locked to the seat sub-frame member in the second position.

14. The vehicle seat of claim 13 wherein the first linkage member moves to a substantially vertical orientation and the second linkage member stays at a substantially horizontal orientation when the seat is moved from the second position to a third position.

15. The vehicle seat of claim 13, wherein a side wall of the first linkage member is adjacent and aligned with a the side wall of the second linkage member in the first position.

16. The vehicle seat of claim 13, wherein the first linkage member is nested within the second linkage member in the first position.

17. The vehicle seat of claim 13, wherein the seat back is substantially upright relative to the seat base in the first position and the seat back is folded forward and aligned with the seat base in the second position, and the seat back is folded forward against the seat base, and the seat back and seat base are perpendicular relative to a vehicle floor in the third position.

18. The vehicle seat of claim 13, wherein the vehicle seat includes at least one latch for interlocking with a striker coupled to the vehicle to thereby lock the vehicle seat in position.

* * * * *